(12) United States Patent
Zaifman et al.

(10) Patent No.: US 10,999,167 B2
(45) Date of Patent: May 4, 2021

(54) VARYING DATA FLOW AGGREGATION PERIOD RELATIVE TO DATA VALUE

(71) Applicant: AT&T Intellectual Property I, L.P., Atlanta, GA (US)

(72) Inventors: Arthur Zaifman, Millburn, NJ (US); John Mark Mocenigo, Califon, NJ (US); Joseph Dorsey, Jr., Allen, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 201 days.

(21) Appl. No.: 15/952,829

(22) Filed: Apr. 13, 2018

(65) Prior Publication Data
US 2019/0319862 A1    Oct. 17, 2019

(51) Int. Cl.
*H04L 12/26* (2006.01)
*H04L 12/24* (2006.01)
*G06F 16/22* (2019.01)

(52) U.S. Cl.
CPC ............ *H04L 43/026* (2013.01); *G06F 16/22* (2019.01); *H04L 41/50* (2013.01); *G06F 2216/03* (2013.01)

(58) Field of Classification Search
CPC ... H04L 43/026; H04L 41/147; H04L 41/142; H04L 63/1408; H04L 43/0876; H04L 47/2441; H04L 47/2483; H04L 47/10
See application file for complete search history.

(56) References Cited

U.S. PATENT DOCUMENTS

| | | | |
|---|---|---|---|
| 6,839,751 B1 * | 1/2005 | Dietz | H04L 43/00 709/223 |
| 7,002,960 B1 * | 2/2006 | Golan | H04L 41/145 370/393 |
| 7,143,153 B1 | 11/2006 | Black | |

(Continued)

FOREIGN PATENT DOCUMENTS

| CN | 103516558 B | 12/2016 |
|---|---|---|
| WO | WO2012142854 A1 | 10/2012 |

(Continued)

OTHER PUBLICATIONS

Borzemski, Leszek, "Internet path behavior prediction via data mining: Conceptual framework and case study", J. UCS 13.2 (2007): 287-316.

(Continued)

*Primary Examiner* — Hitesh Patel
*Assistant Examiner* — Alex H. Tran

(57) ABSTRACT

In one example, the present disclosure describes a device, computer-readable medium, and method for varying the aggregation periods for data flows relative to the values of the data contained in the flows. For instance, in one example, a method includes intercepting a first flow and a second flow traversing a communications network, assigning a first value to the first flow and a second value to the second flow, wherein the first value is higher than the second value, aggregating the first flow into a first database record according to a first aggregation period, aggregating the second flow into a second database record according to a second aggregation period that is longer than the first aggregation period, and storing the first database record and the second database record in a database.

17 Claims, 3 Drawing Sheets

(56) References Cited

U.S. PATENT DOCUMENTS

| | | | |
|---|---|---|---|
| 7,506,046 B2 | 3/2009 | Rhodes | |
| 7,543,052 B1 | 6/2009 | Cesa | |
| 7,571,181 B2 | 8/2009 | Rhodes | |
| 7,580,356 B1* | 8/2009 | Mishra | H04L 43/026 370/230.1 |
| 7,873,727 B2 | 1/2011 | Pal | |
| 7,990,982 B2* | 8/2011 | Duffield | H04L 43/16 370/400 |
| 8,095,635 B2* | 1/2012 | Wang | H04L 41/142 709/223 |
| 8,125,909 B2* | 2/2012 | McCann | H04W 28/10 370/235 |
| 9,003,010 B1 | 4/2015 | Saparoff | |
| 9,112,894 B2 | 8/2015 | Ramadass | |
| 9,130,826 B2 | 9/2015 | Nispel | |
| 9,246,747 B2 | 1/2016 | Chan | |
| 9,294,560 B2 | 3/2016 | Klein | |
| 9,331,919 B2 | 5/2016 | Stephens | |
| 9,392,010 B2 | 7/2016 | Friedman | |
| 9,407,518 B2 | 8/2016 | Kay | |
| 9,438,488 B2 | 9/2016 | Joshi | |
| 9,529,621 B2 | 12/2016 | Richards | |
| 9,549,335 B2 | 1/2017 | Kotecha | |
| 9,749,150 B2 | 8/2017 | McLeod | |
| 9,755,942 B2 | 9/2017 | Leogrande | |
| 9,860,145 B2 | 1/2018 | Mital | |
| 2002/0188710 A1 | 12/2002 | Duffield | |
| 2008/0253287 A1* | 10/2008 | Gupta | H04L 47/10 370/235 |
| 2009/0059812 A1* | 3/2009 | Chinnaswamy | H04L 41/5061 370/253 |
| 2010/0070647 A1* | 3/2010 | Irino | H04L 47/12 709/234 |
| 2011/0040706 A1* | 2/2011 | Sen | G06N 20/00 706/12 |
| 2012/0064908 A1* | 3/2012 | Fox | H04W 28/10 455/452.2 |
| 2012/0311704 A1* | 12/2012 | Reilly | H04L 43/04 726/22 |
| 2015/0348406 A1 | 12/2015 | Fowe | |
| 2017/0090679 A1* | 3/2017 | Apokatanidis | G06F 9/453 |
| 2017/0126550 A1* | 5/2017 | Taylor | H04L 43/024 |
| 2017/0126583 A1* | 5/2017 | Xia | H04L 43/0882 |
| 2018/0041643 A1 | 2/2018 | Richards | |
| 2018/0069668 A1* | 3/2018 | Jorgensen | H04L 69/161 |
| 2018/0103408 A1* | 4/2018 | Amini | G08B 13/2494 |
| 2018/0176624 A1* | 6/2018 | Phillips | H04M 15/00 |
| 2018/0225132 A1* | 8/2018 | Pierce | G06F 9/453 |
| 2018/0375915 A1* | 12/2018 | Sridhar | H04L 47/38 |

FOREIGN PATENT DOCUMENTS

| | | |
|---|---|---|
| WO | WO2013171234 A1 | 11/2013 |
| WO | WO2017124708 A1 | 7/2017 |

OTHER PUBLICATIONS

Clegg, R. G., et al. "Challenges in the capture and dissemination of measurements from high-speed networks." arXiv preprint arXiv:1303.6908 (2013).

Arefin, Ahsan, et al., "Diagnosing data center behavior flow by flow", Distributed Computing Systems (ICDCS), 2013 IEEE 33rd International Conference, 2013.

Adams, Louis H. et al., "Issues and Challenges in Using Existing Data and Tools for Performance Measurement", Performance Measures to Improve T (2005): 131-140.

Kohl, Benjamin, et al., "Development of a network data set for evaluating detection and network processing performance", Proceedings of the 26th Seismic Research Review: Trends in Nuclear Explosion Monitoring, 2004.

* cited by examiner

VARYING DATA FLOW AGGREGATION PERIOD RELATIVE TO DATA VALUE

The present disclosure relates generally to data mining, and relates more particularly to devices, non-transitory computer-readable media, and methods for varying the aggregation periods for data flows relative to the values of the data contained in the flows.

BACKGROUND

Data mining has become a valuable tool for helping network service providers to analyze and understand their subscribers' (i.e., customers') service-related needs. For instance, information can be extracted from a data set (e.g., a set of packets exchanged between network endpoints) and transformed into a structure that can be analyzed for the occurrence of patterns, relationships, and other statistics that indicate how the subscribers are using the network.

SUMMARY

In one example, the present disclosure describes a device, computer-readable medium, and method for varying the aggregation periods for data flows relative to the values of the data contained in the flows. For instance, in one example, a method includes intercepting a first flow and a second flow traversing a communications network, assigning a first value to the first flow and a second value to the second flow, wherein the first value is higher than the second value, aggregating the first flow into a first database record according to a first aggregation period, aggregating the second flow into a second database record according to a second aggregation period that is longer than the first aggregation period, and storing the first database record and the second database record in a database.

In another example, a computer-readable medium stores instructions which, when executed by a processor, cause the processor to perform operations. The operations include intercepting a first flow and a second flow traversing a communications network, assigning a first value to the first flow and a second value to the second flow, wherein the first value is higher than the second value, aggregating the first flow into a first database record according to a first aggregation period, aggregating the second flow into a second database record according to a second aggregation period that is longer than the first aggregation period, and storing the first database record and the second database record in a database.

In another example, a device includes a processor and a computer-readable medium storing instructions which, when executed by the processor, cause the processor to perform operations. The operations include intercepting a first flow and a second flow traversing a communications network, assigning a first value to the first flow and a second value to the second flow, wherein the first value is higher than the second value, aggregating the first flow into a first database record according to a first aggregation period, aggregating the second flow into a second database record according to a second aggregation period that is longer than the first aggregation period, and storing the first database record and the second database record in a database.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
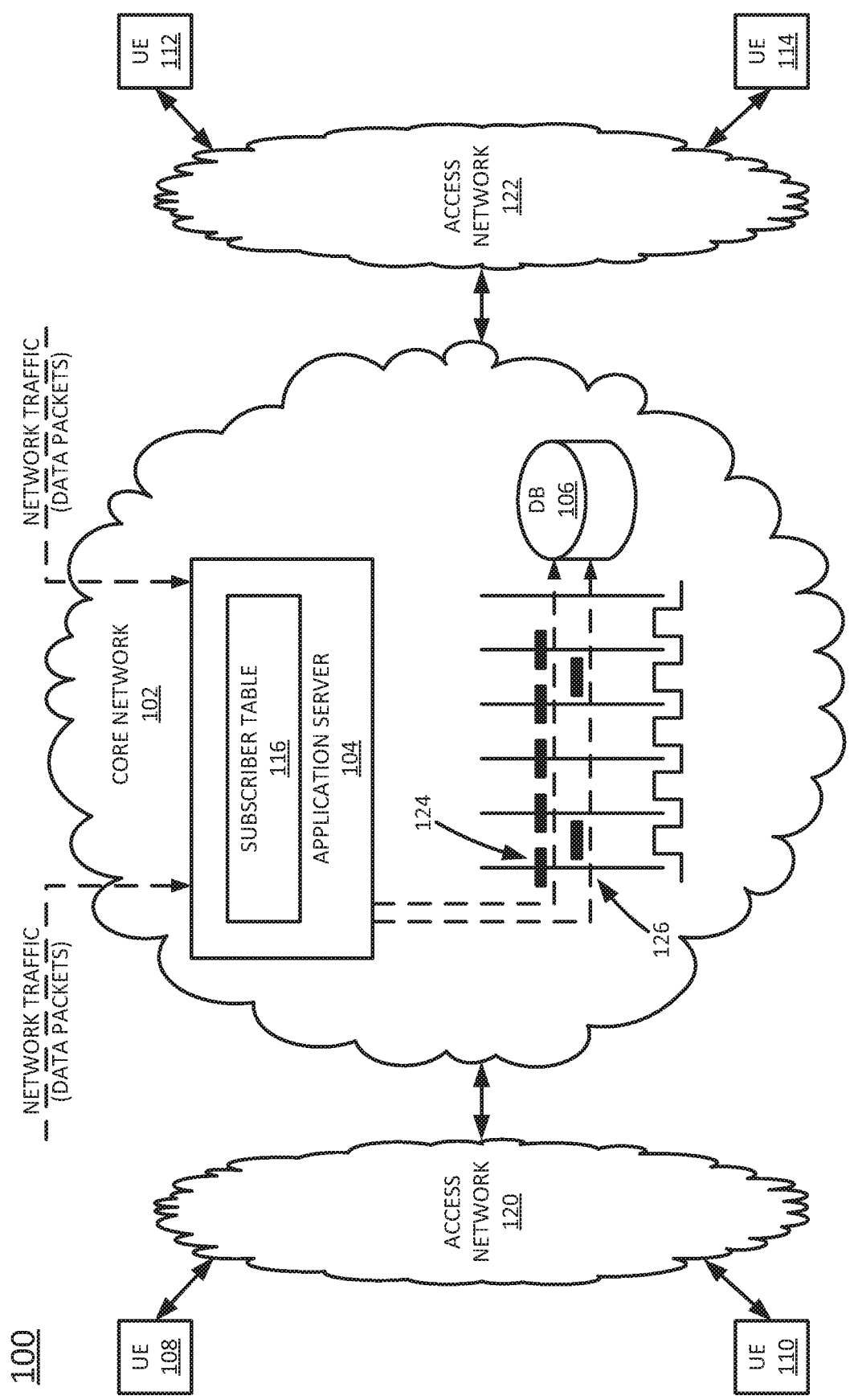
FIG. 1 illustrates an example network related to the present disclosure.

In one example, the present disclosure varies the aggregation periods (i.e., the frequencies or intervals with which aggregation is performed) for data flows relative to the values of the data contained in the flows. As discussed above, data mining has become a valuable tool for helping network service providers to analyze and understand their subscribers' service-related needs. Network traffic can be analyzed for patterns, relationships, and other statistics that indicate how the subscribers are using the network.

The basic unit of network traffic is a "flow," i.e., a series of data packets exchanged between two network endpoints. Data packets belonging to the same flow of packets will contain the same flow key. In one embodiment, the flow key is a 5-tuple defining the Transmission Control Protocol/Internet Protocol (TCP/IP) connection via which the data packet travels. In one example, the 5-tuple includes: the source IP address, the destination IP address, the source port number (e.g., Transmission Control Protocol/User Datagram Protocol or TCP/UDP port number), the destination port number (e.g., TCP/UDP port number), and the type of service (ToS). Generally, data packets are aggregated into flows based on a fixed interval of time. For instance, data packets may be aggregated into flows every N seconds, where M flows are produced every N-second interval. In turn, the flows may be aggregated into database records and stored in a database every P seconds (where P may be greater than N). The database may subsequently be mined for metadata containing useful information, such as how particular subscribers use their endpoint devices (e.g., whether they use their endpoint devices mostly for streaming video, or playing games, or making phone calls). Once the patterns of use associated with a subscriber's endpoint device are known, a service provider may tailor the service to that endpoint device to better suit the subscriber's needs (e.g., allocating more bandwidth, varying rate channel characteristics, deploying additional base stations, etc.).

The amount of metadata generated by even a single flow can be enormous. When scaled out to consider all flows generated by all endpoint devices in a communications network, it can be challenging to identify the metadata that is most valuable. This challenge is magnified by the fact that low-value flows and high-value flows conventionally consume the same amount of processing resources (e.g., central processing unit, random access memory, input/output) and the same storage footprint (e.g., in persistent storage). For instance, when a subscriber uses an endpoint device to visit a news web site, the endpoint device may be bombarded with a plurality of short-duration flows (e.g., advertisements) that give little insight into the device's patterns of use. At the same time, a longer-duration flow may be generated from the subscriber's interactions with one or more news articles, and this longer-duration flow may give more insight into the device's patterns of use. However, both the short-duration flows and the longer-duration flows may take up the same amount of space in the database due to the fact that they are aggregated according to the same aggregation period (e.g., M flows every N seconds).

Examples of the present disclosure vary the aggregation periods for data flows relative to the values of the data contained in the flows. For instance, flows containing low value data may be aggregated into database records based on a first time interval, while flows containing high value information may be aggregated into database records based on a second time interval that is shorter than the first time interval. The level of granularity of detail in the high value flows when stored in the database will thus be greater than the level of granularity of detail in the low value flows, as the individual database records containing the high value flows will contain less data. This enhances the visibility of valuable metadata. The value of a flow, or of a data packet, may be determined in any one or more of a plurality of ways, including, for example, the number of data packets in the flow, the duration of the data packets in the flow, or other ways.

Within the context of the present disclosure, the "value" of a flow refers to the impact the network traffic contained in a flow has on the physical network over which the network traffic is carried (or, alternatively, the level of insight the network traffic can provide into subscriber use patterns). The impact on the physical network may be evaluated in terms of the volume or rate of the network traffic, the type of the network traffic (e.g., Voice over Long Term Evolution, hot spot/tethered, connected car, streaming audio/video, etc.), anomalies (e.g., higher than average number of retransmits, etc.), and/or on other metrics. Moreover, examples of the disclosure define value at a subscriber-level granularity. The value of certain subscriber-centric metadata may increase over time, and may be allocated resources only when the value of the subscriber-centric metadata meets or exceeds a predefined (configurable) threshold.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single application server 104 and a single database 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114. Access networks 120 and 122 may transmit and receive communications between respective UEs 108, 110, 112, and 124 and core network 102 relating to communications with web servers, AS 104, and/or other servers via the Internet and/or other networks, and so forth.

In one embodiment, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

In one example, the application server 104 is configured to aggregate data packets traversing the core network 102 into flows. The application server 104 is further configured to aggregate the flows into database records and to send the database records to the database 106 for storage. In one example, the application server 104 utilizes a subscriber table 116 to assign value to the flows (e.g., to differentiate between high value flows and low value flows). As discussed in further detail below, the application server 104 may use different aggregation periods for aggregating the high value flows and the low value flows into respective database records. For instance, high value flows may be aggregated into database records using a shorter aggregation period than is used for aggregating low value flows. Thus, database records containing high value flows will contain less metadata than database records containing low value flows, making the metadata contained in the high value flows more visible.

The database 106 stores the database records produced by the application server 104. The database 106 may be mined, e.g., by a communications service provider, for metadata indicative of subscriber use patterns. These use patterns, in turn, may be used to tailor service to subscribers (e.g., allocating more bandwidth, varying rate channel characteristics, deploying additional base stations, etc.).

Figure 3:
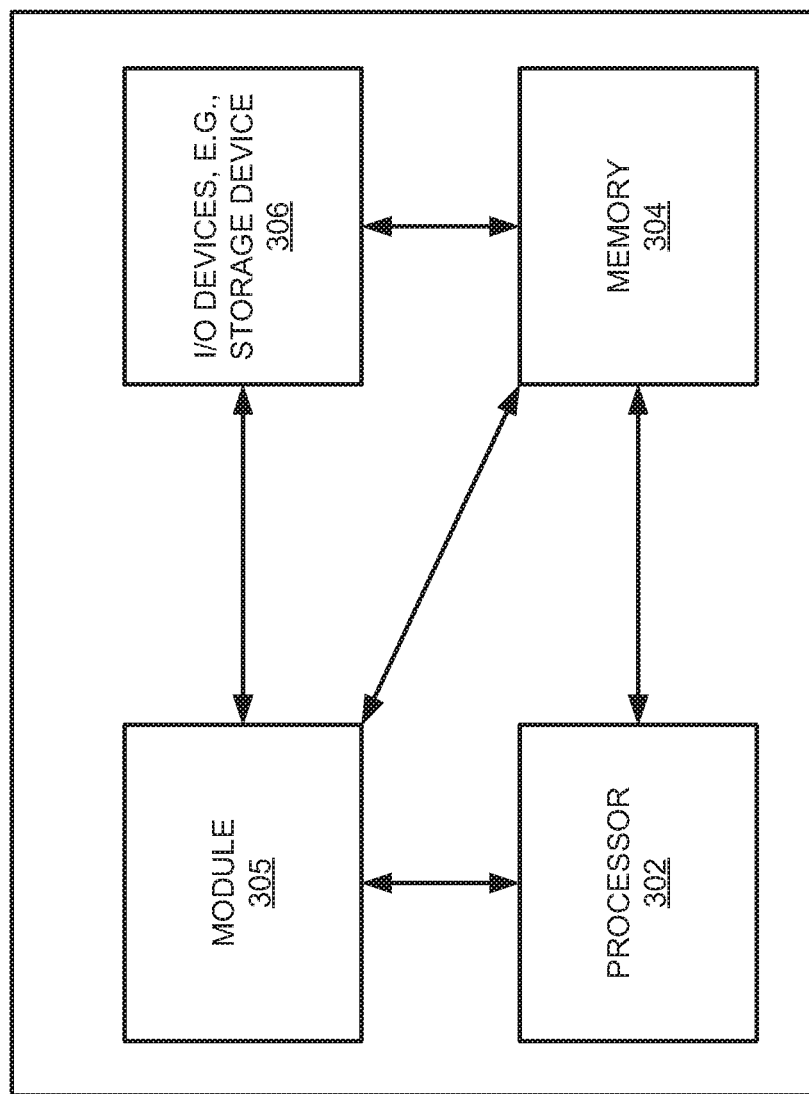
FIG. 3 depicts a high-level block diagram of a computing device specifically programmed to perform the functions described herein.

The application server 104 may comprise or be configured as a general purpose computer as illustrated in FIG. 3 and discussed below. It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
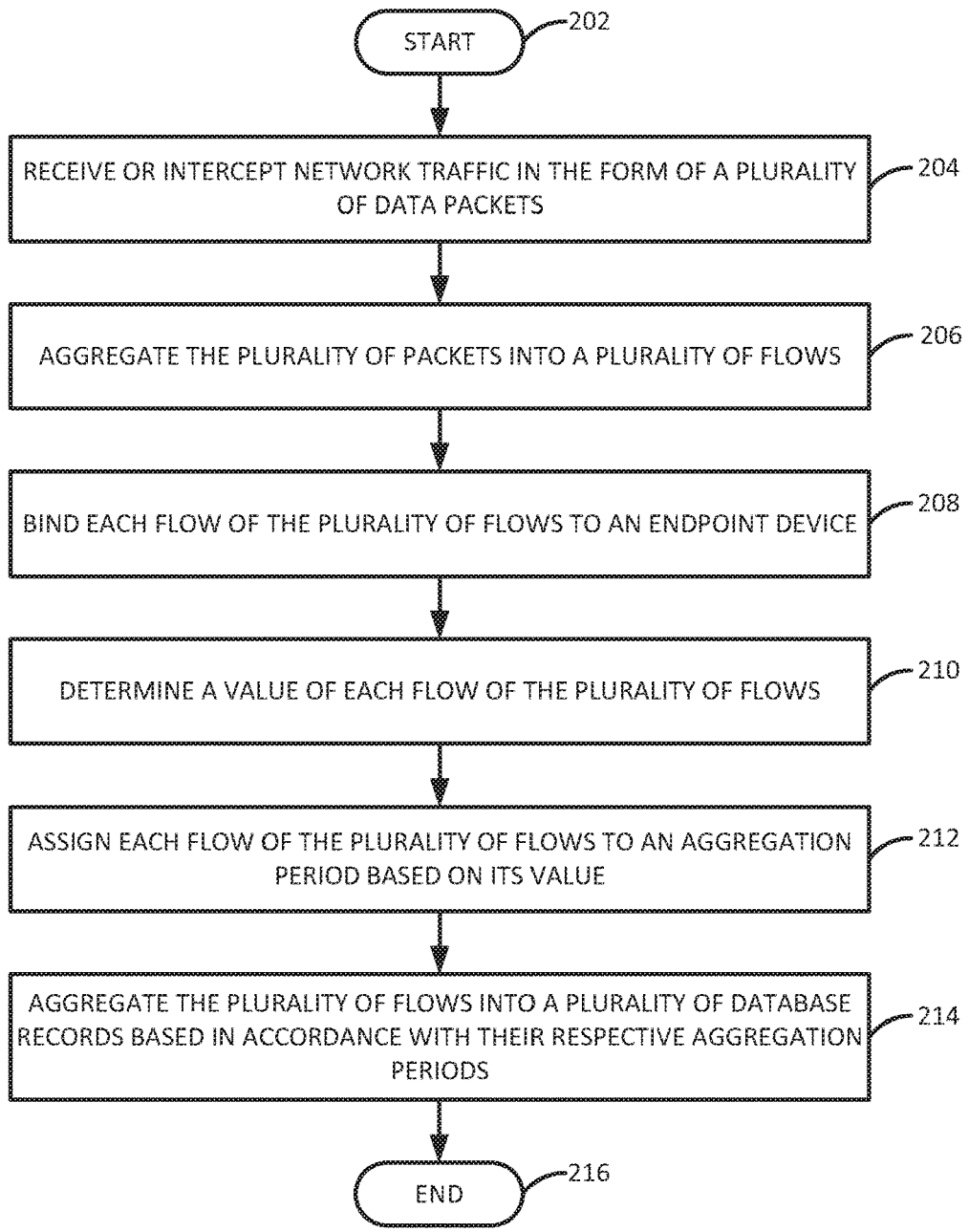
FIG. 2 illustrates a flowchart of a first example method for aggregating data flows based on the relative value of the data.

To further aid in understanding the present disclosure, FIG. 2 illustrates a flowchart of a first example method 200 for aggregating data flows based on the relative value of the data. In one example, the method 200 may be performed by the application server 104 illustrated in FIG. 1. However, in other examples, the method 200 may be performed by another device. As such, any references in the discussion of the method 200 to the application server 104 of FIG. 1 (or any other elements of FIG. 1) are not intended to limit the means by which the method 200 may be performed.

The method 200 begins in step 202. In step 204, network traffic in the form of a plurality of data packets is received or intercepted (e.g., by the application server 104 of FIG. 1). The plurality of data packets may be replicas of data packets that traverse a communications network (such as the network 100 of FIG. 1). The plurality of packets may include at least first packet and a second packet.

In step 206, the plurality of data packets is aggregated into a plurality of flows. In one example, a data packet is aggregated into a flow with other data packets sharing a common flow key, as discussed above. Thus, data packets that share the same source IP address, destination IP address, source port number, destination port number, and the type of service may be aggregated into a single flow. The plurality of flows may include at least a first flow and a second flow.

In step 208, each flow of the plurality of flows may be bound to an endpoint device (such as one of the UEs 108, 110, 112, or 114 of FIG. 1). The flow may be bound to an endpoint device based on the source IP address, destination IP address, source port number, and/or destination port number. In one example, the endpoint device is an endpoint device that is used by a subscriber to access a communications network such as the network 100 of FIG. 1.

In step 210, the value of each flow is determined. As discussed above, in one example, the value of a flow may be based on the number of data packets in the flow, the duration of the data packets in the flow, or on other metrics. In another example, the value of a flow may be determined based on an entry in a subscriber table (such as subscriber table 116 of FIG. 1) for the endpoint device to which it is bound. For instance, each endpoint device may be associated with a profile in the subscriber table. The profile may contain information regarding the historical patterns of usage of the endpoint device (e.g., the applications that are most frequently used on the endpoint device at particular times of day or on particular days of the week, the web sites that are most frequently visited using the endpoint device, the types of network traffic most frequently sent to/from the endpoint device while connected to the communications network, etc.).

Based on the information regarding the historical patterns of usage, the value of a given flow can be estimated. For example, it may be determined that a given endpoint device is currently streaming video data (which may be associated with relatively long flows). It may also be determined, based on the profile for the given endpoint device in the subscriber table, that the given endpoint device is frequently used to stream video data. Thus, if a relatively short flow is bound to the endpoint device in step 208, and this relatively short flow is determined to be concurrent with a longer flow, it may be determined that the value of the relatively short flow is low (e.g., it may constitute advertising as opposed to more substantive media content). Alternatively, it may be known, based on the corresponding profile in the subscriber table, that a given endpoint device is frequently used to access a service associated with a particular domain name service (DNS) name server. It may also be known that the DNS name server is associated with a lot of flows containing advertising. Thus, relatively short flows exchanged between the DNS name server and the endpoint device may be assumed to comprise advertising and may be considered to be of low value. As such, the profiles in the subscriber table may provide context for the flows that are bound to the endpoint devices, and this context may help to distinguish between high value and low value flows.

In one example, differentiation between high value and low value flows is a binary operation, e.g., each flow is identified as being either "high value" or "low value." "High" or "low" may be determined relative to some predefined (configurable) threshold. For instance, flows whose values do not at least meet the predefined threshold may be considered "low" value, while flows whose values at least meet the predefined threshold may be considered "high" value. In other examples, however, the differentiation may be different. For instance, the value of a flow may be assigned as a numerical value on a scale of values (e.g., a scale from 1 to 5), a category on a rubric (e.g., very low, low, moderate, high, very high), or in some other way.

In step 212, each flow is assigned to an aggregation period based on its value as determined in step 210. In one example, each category or value is associated with a specific aggregation period. For instance, "high" value flows may be aggregated every S seconds, while "low" value flows may be aggregated every T seconds. The aggregation periods may be predefined based on the values of the flows. In one example, higher-value flows are assigned shorter aggregation periods, whereas lower value flows are assigned longer aggregation periods. Thus, the duration of the aggregation period for a flow is proportional to the flow's value. A plurality of different aggregation periods (e.g., including at least a first aggregation period and a second aggregation period) may be available.

In step 214, the plurality of flows is aggregated into a plurality of database records (e.g., including at least a first database record and a second database record) in accordance with their respective aggregation periods. For instance, FIG. 1 illustrates a first plurality of flows being aggregated into a first plurality of database records 124 according to a first aggregation period, and a second plurality of flows being aggregated into a second plurality of database records 126 according to a second, longer aggregation period. The plurality of database records is stored in a database (e.g., database 106 of FIG. 1). By aggregating the flows in a manner proportional to value before storing the database records, it can be assured that the database records possess enough value (e.g., at least a threshold amount) to consume the network resources (processing, persistent storage, etc.) needed to maintain them.

The method 200 ends in step 216. The database may subsequently be mined for data that can be used to tailor service to subscribers (e.g., allocating more bandwidth, varying rate channel characteristics, deploying additional base stations, etc.). For instance, network resources could be allocated in proportion to the values of the flows (e.g., high value flows such as flows associated with video streaming could be assigned more resources than low value flows). In another example, a database event (e.g., a notification sent to a service provider) could be triggered when the value of a flow aggregated into an incoming database record exceeds a predefined (configurable) threshold. The method 200 thus scales resource consumption while preserving the visibility of valuable metadata that can be used to improve service to subscribers. By contrast, other techniques for scaling resource consumption, such as sampling, tend to operate arbitrarily, without considering the relative value of various metadata.

Although not expressly specified above, one or more steps of the method 200 may include a storing, displaying, and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300.

For instance, the application server 104 of FIG. 1 (such as might be used to perform the method 200) could be implemented as illustrated in FIG. 3.

As depicted in FIG. 3, the system 300 comprises a hardware processor element 302, a memory 304, a module 305 for varying the aggregation periods for data flows relative to the values of the data contained in the flows, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for varying the aggregation periods for data flows relative to the values of the data contained in the flows may include circuitry and/or logic for performing special purpose functions relating to data mining. The input/output devices 306 may include, for example, storage devices (including but not limited to, a tape drive, a floppy drive, a hard disk drive or a compact disk drive), a receiver, a transmitter, a fiber optic communications line, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for varying the aggregation periods for data flows relative to the values of the data contained in the flows (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for varying the aggregation periods for data flows relative to the values of the data contained in the flows (including associated data structures, such as subscriber tables) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
    intercepting, by an application server, a first flow and a second flow concurrently traversing a communications network, wherein the first flow comprises a first plurality of aggregated data packets and the second flow comprises a second plurality of aggregated data packets;
    binding, by the application server, the first flow and the second flow to a first endpoint device connected to the communications network based on at least one of: a source internet protocol address, a destination internet protocol address, a source port number, and a destination port number;
    obtaining, by the application server, a subscriber table that associates a first profile with the first endpoint device;
    assigning, by the application server, a first value to the first flow based on a historical pattern of usage of the first endpoint device, wherein the historical pattern of usage is indicated in the subscriber table, the historical pattern of usage denoting a frequency of use for various applications on the first endpoint device, wherein the historical pattern of usage includes times the various applications were used, and wherein the first value represents an impact on the communications network of network traffic contained in the first flow or a level of insight the network traffic contained in the first flow provides into a subscriber user pattern;
    assigning, by the application server, a second value to the second flow based on the historical pattern of usage of the first endpoint device, wherein the first value is higher than the second value, and wherein the second value represents an impact on the communications network of network traffic contained in the second flow or a level of insight the network traffic contained in the second flow provides into a subscriber user pattern;
    aggregating, by the application server, the first flow into a first database record according to a first aggregation period, wherein the first aggregation period is associated with the first value;
    aggregating, by the application server, the second flow into a second database record according to a second aggregation period that is longer than the first aggregation period, wherein the second aggregation period is associated with the second value;
    storing, by the application server, the first database record and the second database record in a database; and
    tailoring, by the application server, service over the communications network to the first endpoint device by allocating resources of the communications network among the first flow and the second flow in proportion to the first value and the second value, respectively.

2. The method of claim 1, wherein the first value is further assigned based on a number of data packets in contained in the first flow.

3. The method of claim 1, wherein the first value is further assigned based on durations of data packets contained in the first flow.

4. The method of claim 1, wherein the historical pattern of usage further identifies applications of the various applications that are most frequently used on the first endpoint device at specific times of day.

5. The method of claim 1, wherein the historical pattern of usage further identifies applications of the various applications that are most frequently used on the first endpoint device on specific days of a week.

6. The method of claim 1, wherein the historical pattern of usage further identifies web sites that are most frequently visited using the first endpoint device.

7. The method of claim 1, wherein the historical pattern of usage further identifies types of network traffic that are most frequently sent to and from the first endpoint device when connected to the communications network.

8. The method of claim 1, wherein the first value at least meets a predefined threshold, and the second value does not meet the predefined threshold.

9. The method of claim 1, wherein the first value and the second value are each numerical values that fall along a scale of values.

10. The method of claim 9, wherein each of the numerical values that falls along the scale of values is associated with a different aggregation period that is predefined based on a corresponding numerical value of the each of the numerical values.

11. The method of claim 1, wherein the first value and the second value are each categories that fall along a rubric.

12. The method of claim 1, wherein the first aggregation period defines a first frequency with which flows are aggregated into the first database record, and the second aggregation period defines a second frequency with which flows are aggregated into the second database record.

13. A non-transitory computer-readable medium storing instructions which, when executed by the processor of an application server, cause the processor to perform operations, the operations comprising:
    intercepting a first flow and a second flow concurrently traversing a communications network, wherein the first flow comprises a first plurality of aggregated data packets and the second flow comprises a second plurality of aggregated data packets;
    binding the first flow and the second flow to a first endpoint device connected to the communications network based on at least one of: a source internet protocol address, a destination internet protocol address, a source port number, and a destination port number;
    obtaining a subscriber table that associates a first profile with the first endpoint device;
    assigning a first value to the first flow based on a historical pattern of usage of the first endpoint device, wherein the historical pattern of usage is indicated in the subscriber table, the historical pattern of usage denoting a frequency of use for various applications on the first endpoint device, wherein the historical pattern of usage includes times the various applications were used, and wherein the first value represents an impact on the communications network of network traffic contained in the first flow or a level of insight the network traffic contained in the first flow provides into a subscriber user pattern;

assigning a second value to the second flow based on the historical pattern of usage of the first endpoint device, wherein the first value is higher than the second value, and wherein the second value represents an impact on the communications network of network traffic contained in the second flow or a level of insight the network traffic contained in the second flow provides into a subscriber user pattern;

aggregating the first flow into a first database record according to a first aggregation period, wherein the first aggregation period is associated with the first value;

aggregating the second flow into a second database record according to a second aggregation period that is longer than the first aggregation period, wherein the second aggregation period is associated with the second value;

storing the first database record and the second database record in a database; and tailoring service over the communications network to the first endpoint device by allocating resources of the communications network among the first flow and the second flow in proportion to the first value and the second value, respectively.

14. The non-transitory computer-readable medium of claim 13, wherein the first aggregation period defines a first frequency with which flows are aggregated into the first database record, and the second aggregation period defines a second frequency with which flows are aggregated into the second database record.

15. An application server, comprising:

a processor; and a non-transitory computer-readable medium storing instructions which, when executed by the processor, cause the processor to perform operations, the operations comprising:

intercepting a first flow and a second flow concurrently traversing a communications network, wherein the first flow comprises a first plurality of aggregated data packets and the second flow comprises a second plurality of aggregated data packets;

binding the first flow and the second flow to a first endpoint device connected to the communications network based on at least one of: a source internet protocol address, a destination internet protocol address, a source port number, and a destination port number;

obtaining a subscriber table that associates a first profile with the first endpoint device;

assigning a first value to the first flow based on a historical pattern of usage of the first endpoint device, wherein the historical pattern of usage is indicated in the subscriber table, the historical pattern of usage denoting a frequency of use for various applications on the first endpoint device, wherein the historical pattern of usage includes times the various applications were used, and wherein the first value represents an impact on the communications network of network traffic contained in the first flow or a level of insight the network traffic contained in the first flow provides into a subscriber user pattern;

assigning a second value to the second flow based on the historical pattern of usage of the first endpoint device, wherein the first value is higher than the second value, and wherein the second value represents an impact on the communications network of network traffic contained in the second flow or a level of insight the network traffic contained in the second flow provides into a subscriber user pattern;

aggregating the first flow into a first database record according to a first aggregation period, wherein the first aggregation period is associated with the first value;

aggregating the second flow into a second database record according to a second aggregation period that is longer than the first aggregation period, wherein the second aggregation period is associated with the second value;

storing the first database record and the second database record in a database; and tailoring service over the communications network to the first endpoint device by allocating resources of the communications network among the first flow and the second flow in proportion to the first value and the second value, respectively.

16. The method of claim 7, wherein the first flow and the second flow are determined to be associated with a first type of the types of network traffic that are most frequently sent to and from the first endpoint device, and wherein the first flow is assigned the first value that is higher than the second value based on the first flow having a longer duration than the second flow.

17. The method of claim 1, wherein the first database record contains less data than the second database record, after the aggregating the first flow and the aggregating the second flow, so that a granularity of detail of the first database record is greater than a granularity of detail of the second database record.

* * * * *